United States Patent [19]
Martin

[11] Patent Number: 5,855,115
[45] Date of Patent: Jan. 5, 1999

[54] AUXILIARY HYDRAULIC MOTOR

[75] Inventor: Louis Martin, Compiegne, France

[73] Assignee: Poclain Hydraulics, France

[21] Appl. No.: 717,850

[22] Filed: Sep. 23, 1996

[30] Foreign Application Priority Data

Oct. 2, 1995 [FR] France ................................. 95 11557

[51] Int. Cl.$^6$ ................................................. F16D 31/02
[52] U.S. Cl. ............................... 60/437; 60/435; 60/718; 92/72; 192/85 CA
[58] Field of Search ........................... 60/435, 437, 718; 92/72; 192/85 CA, 69.8

[56] References Cited

U.S. PATENT DOCUMENTS

| | | | |
|---|---|---|---|
| 1,057,623 | 4/1913 | Delaunay-Belleville | 60/437 |
| 1,435,903 | 11/1922 | Holmes | 192/69.8 |
| 2,710,086 | 6/1955 | Stahl . | |
| 4,293,061 | 10/1981 | Brown | 192/85 CA |
| 4,624,356 | 11/1986 | Hanks et al. | 192/85 CA |
| 4,704,948 | 11/1987 | Wusthof et al. | 92/72 |

FOREIGN PATENT DOCUMENTS

| | | |
|---|---|---|
| 0967275 | 10/1950 | France . |
| 2072364 | 9/1971 | France . |
| 2639406 | 5/1990 | France . |
| 74092 | 1/1917 | Switzerland ............................. 60/435 |

*Primary Examiner*—F. Daniel Lopez
*Attorney, Agent, or Firm*—Ladas & Parry

[57] ABSTRACT

An auxiliary hydraulic motor comprises a fixed casing having a cam, a cylinder block, an internal fluid distributor, and a through shaft which extends inside the casing along the axis of rotation of the cylinder block. The through shaft is constituted by a length of a vehicle transmission shaft. The motor includes an axially moving coupling member suitable, in a first position, for being engaged with the cylinder block and the shaft via first and second mechanical engagement means, and in a second position, for being disengaged from the cylinder block and/or the shaft.

16 Claims, 2 Drawing Sheets

AUXILIARY HYDRAULIC MOTOR

FIELD OF THE INVENTION

The present invention relates to an auxiliary hydraulic motor, comprising:

- a fixed casing having main ducts for fluid feed and exhaust;
- a reaction member secured to the casing;
- a cylinder block mounted to rotate relative to said reaction member about an axis of rotation and including a plurality of piston-and-cylinder assemblies disposed radially relative to the axis of rotation and suitable for being fed with fluid under pressure;
- an internal fluid distributor secured to the casing against rotation about the axis of rotation and including distribution ducts suitable for putting the cylinders into communication with the main fluid feed and exhaust ducts; and
- a through shaft extending inside the casing along the axis of rotation.

BACKGROUND OF THE INVENTION

It is known that the advantage of such motors lies in the fact that they are capable of driving the through shaft at small and variable speeds of rotation while nevertheless developing large torque, it being possible for speed variation to be progressive and continuous.

OBJECT AND SUMMARY OF THE INVENTION

The present invention seeks to provide a motor of this type suitable for assisting a "main" motor of a vehicle, with the auxiliary hydraulic motor being used under special working conditions of the vehicle in which its speed is low and variable, while the main motor, e.g. an atmospheric diesel engine, is used in conventional manner on the road. By way of example, the vehicle may be a trash cart, a road maintenance vehicle, or a spreader truck. More specifically, the invention seeks to provide a compact motor which, when fixed beneath the chassis of a vehicle, enables the mechanical components of its basic transmission to be reused at low speed for hydraulic transmission with a continuously variable transmission ratio.

This object is achieved by the facts that the through shaft is constituted by a length of shaft in the transmission of a vehicle, which shaft is suitable for being coupled to a "main" engine of the vehicle via a clutch system; and that the motor further includes a coupling member, first mechanical engagement means for constraining the coupling member and the cylinder block to rotate together, and second mechanical engagement means for constraining the coupling member and the through shaft to rotate together, the coupling member being axially movable between a "active" first position in which the first and second engagement means are mutually engaged, and a "inactive" second position in which at least one of the first and second mechanical engagement means are disengaged, the motor including control means for controlling displacement of the coupling member between said first and second positions.

By means of these dispositions, the auxiliary hydraulic motor is installed directly on the conventional transmission shaft of the vehicle, or more precisely on a length of said shaft. Thus, all of the conventional transmission elements are used normally, in particular the clutch system, the gear box, and the back axle. When the couple member is in its inactive position, the through shaft is free to rotate relative to the cylinder block of the hydraulic motor, so the conventional transmission of the vehicle can be used in completely normal manner by running the main engine. In contrast, when the coupling member is in its active position, the through shaft (and consequently the transmission shaft of the vehicle) can be rotated by the cylinder block of the hydraulic motor while the conventional transmission is declutched and thus inactive. The hydraulic motor is preferably fed with fluid in conventional manner by a pump which is driven directly by the main engine of the vehicle.

BRIEF DESCRIPTION OF THE DRAWINGS

The invention will be well understood and its advantages will appear more clearly on reading the following detailed description of an embodiment given by way of non-limiting example. The description refers to the accompanying drawings, in which.

MORE DETAILED DESCRIPTION

Figure 1:
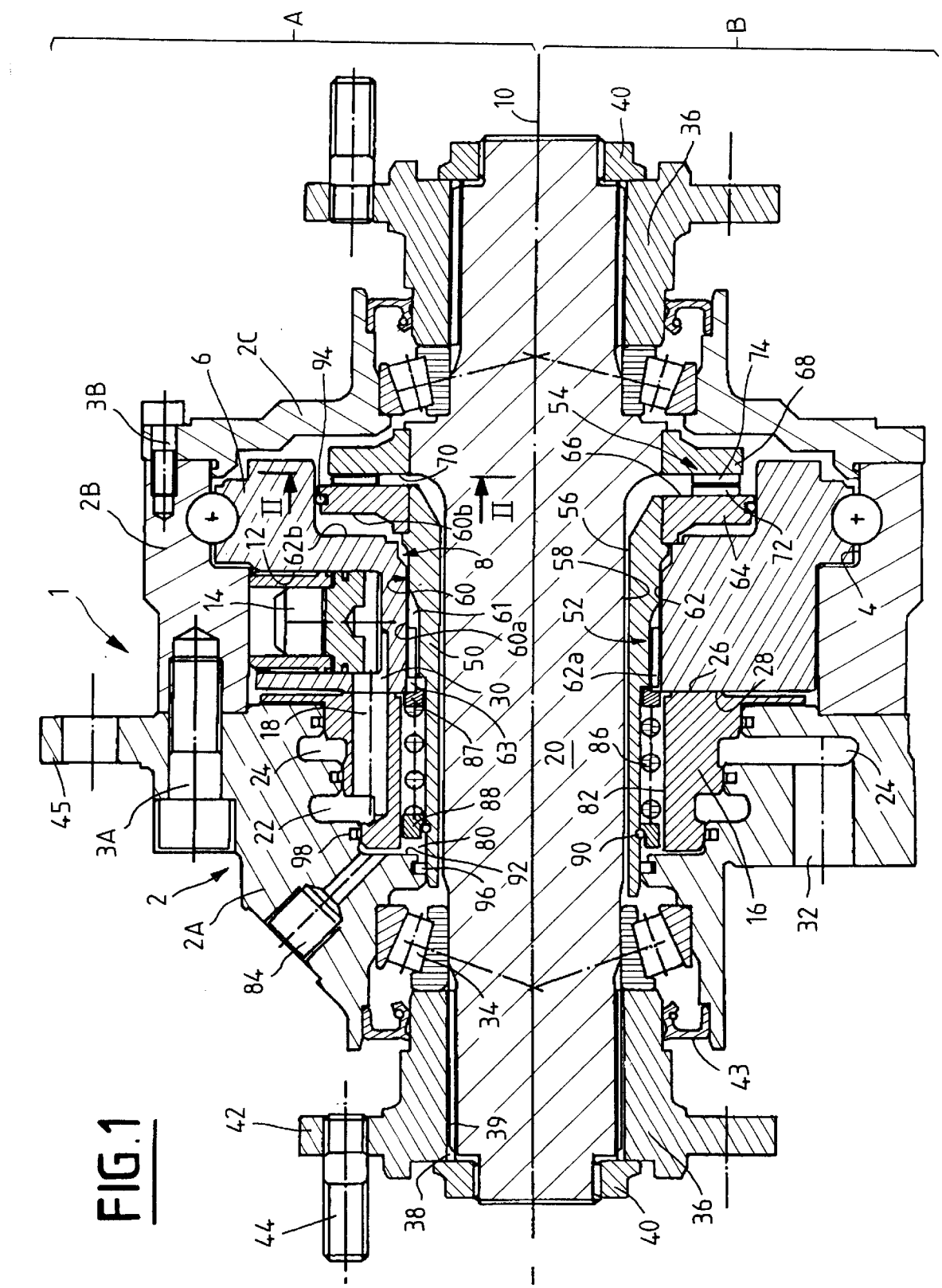
FIG. 1 is a view of the motor in axial section.

FIG. 1 shows a hydraulic motor 1 comprising:

- a fixed casing 2 comprising three portions 2A, 2B, and 2C that are assembled together by bolts 3A and 3B;
- an undulating reaction cam 4 formed on the internal periphery of casing portion 2B;
- a cylinder block 6 having a central bore 8 and mounted to rotate relative to the undulating reaction cam 4 about an axis of rotation 10, the cylinder block having a plurality of radial cylinders 12 suitable for being fed with fluid under pressure, and having pistons 14 slidably mounted therein;
- an internal fluid distributor 16 secured to the casing 2 to prevent it rotating about the axis 10 and including distribution ducts 18 capable of communicating with the cylinders 12; and
- a through shaft 20 which extends inside the casing 2 along the axis of rotation 10, the internal distributor 16 and the cylinder block 6 being disposed around the through shaft.

Grooves 22 and 24 are formed between the portion 2A of the casing and the internal distributor 16. The distribution ducts open out firstly into one of these grooves (the distribution duct 18 opens out into the groove 22) and, secondly, into the distribution face 26 which is perpendicular to the axis 10 and which bears against the communication face 28 of the cylinder block that is likewise perpendicular to the axis 10 and into which there open out cylinder ducts 30 which are thus capable of being put into communication with the distribution ducts.

The grooves 22 and 24 are connected to main fluid feed and exhaust ducts formed in the portion 2A of the casing. Thus, the groove 24 is connected to duct 32.

The through shaft 20 is mounted to rotate relative to the casing 2 about the axis of rotation 10 by means of roller bearings 34.

The through shaft is constituted by a length of a vehicle transmission shaft that is itself suitable for being coupled to the main engine of the vehicle via a clutch system. The hydraulic motor is thus an auxiliary motor which assists the main engine in certain applications where advantage can be taken of the characteristics specific to a hydraulic motor. The various elements of the conventional vehicle transmission are not shown in the figure.

Coupling plates are located at both ends of the through shaft enabling it to be connected to other lengths of the vehicle transmission shaft. Each plate 36 is constrained to rotate with the shaft 20. To this end, the inside faces of the central bores through the plates 36 and the corresponding faces at the ends of the shaft 20 are provided with complementary fluting 38 and 39. In conventional manner, parts 40 for holding the coupling plates axially in position are secured to the free ends of the shaft 20 and co-operate with the outside end faces of the coupling plates. The coupling plates have flanges 42 which are used in conventional manner (via screws 44) for connection to the universal joints supporting the ends of the lengths of transmission shaft for connection to the through shaft. The casing is closed at each of its ends relative to the corresponding coupling plate by means of a respective annular lip gasket 43 of conventional design.

The portion 2A of the casing has a flange 45 constituting a part of the means for fixing the motor to the chassis of the vehicle.

The motor includes a coupling member 50 that serves either to leave the shaft 20 free to rotate relative to the cylinder block 6 of the hydraulic motor, in which case the transmission shaft of the vehicle can be driven by the main engine of the vehicle, or else to constrain the through shaft 20 to rotate together with the cylinder block 6, in which case it is the hydraulic motor that serves to rotate the shaft 20 and consequently the transmission shaft of the vehicle (in which case, the clutch of the conventional transmission must naturally be disengaged).

First mechanical engagement means 52 are provided to constrain the coupling member 50 to rotate with the cylinder block 6, and second mechanical engagement means 54 are provided to constrain the coupling member 50 to rotate with the through shaft 20. The coupling member is axially movable between an active position in which the first and second engagement means 52 and 54 are engaged so that the through shaft 20 is constrained to rotate with the cylinder block 6, and an inactive position in which at least one of the first and second engagement means 52 and 54 is disengaged so that the shaft 20 is free to rotate relative to the cylinder block 6. The motor includes control means for displacing the coupling member 50 between its active and inactive positions, as described below.

In the axial section of FIG. 1, the top half A of the figure situated above the axis of rotation 10 shows the coupling member 50 in its first position where the shaft 20 is constrained to rotate with the cylinder block 6, while at the bottom half B of the figure, situated beneath the axis 10, shows the coupling member 50 in its second position where the shaft 20 is free to rotate relative to the cylinder block 6. In the example shown, the first mechanical engagement means 52 are continuously engaged, thereby permanently constraining the coupling member and the cylinder block to rotate together, while the second mechanical engagement means 54 can be engaged or disengaged (respectively in the first position and in the second position of the coupling member) for selectively constraining the shaft 20 and the coupling member 50 to rotate together or allowing them free to rotate relative to each other. The opposite configuration could also be implemented, as indeed could a configuration in which both engagement means are disengaged in the inactive position.

The coupling member 50 is disposed coaxially around the shaft 20. It has an axial bore and is thus provided with an inside axial face 56 which faces the axial face 58 of the shaft 20. The member 50 also has an outside face 60 situated facing the inside face 62 of the cylinder block 6.

The first mechanical engagement means 52 comprise first axial fluting 61 formed in the outside face 60 of the coupling member 50 and second axial fluting 63 formed in the inside face 62 of the cylinder block where it faces said outside face 60. The first and second sets of axial fluting co-operate in both the first and second positions of the coupling member to constrain the coupling member 50 and the cylinder block 60 permanently to rotate together. On comparing the top and bottom halves of FIG. 1, it can be seen that the sets of fluting 61 and 63 are engaged both in the first position and in the second position of the coupling member. The sets of axial fluting are much longer than the amplitude of the axial displacement of the coupling member as it passes from one of its positions to the other.

The second mechanical engagement means are described below. The coupling member 50 has a first flange 64 presenting a first engagement face 66 that is substantially radial (facing away from the cylinder block), and the through shaft 20 has a second flange 68 with a second engagement face 70 that is substantially radial (facing towards the cylinder block). The flanges 64 and 68 (each of which may be integral with the respective corresponding member 50 or shaft 20, or may be fitted thereto) are implemented in such a manner that the first and second engagement faces 60 and 70 are situated facing each other.

The second mechanical engagement means 54 constitute a positive clutch comprising a first series of teeth 72 formed on the first engagement face 66 and a second series of teeth 74 formed on the second engagement face 70. As shown in the top half A of FIG. 1, in the active position of the coupling member, the teeth in the first and second series mesh together while they are spaced apart in the inactive position of the coupling member, as shown in the bottom half B of FIG. 1.

The radial flange 64 of the coupling member 50 forms a projecting portion on the outside face 60 of said member. The set of fluting 61 which forms a portion of the first mechanical engagement means is formed in an axial portion 60a of said outer face and not on the radially projecting portion 60b thereof. Similarly, the inside face 62 of the cylinder block includes a setback, i.e. a portion over which the diameter of its bore is increased, and in which the flange 64 is received. The set of axial fluting 63 is formed in an axial portion 62a of the inside face 62 and not on the setback portion 62b thereof.

As indicated above, the coupling member 50 is disposed around the shaft 20, while the cylinder block 6 and the internal distribution 16 are disposed around the coupling member 50.

The member 50 constitutes a hydraulically controlled actuator for passing from one of the two positions to the other. More precisely, the means for controlling displacement of the member 50 comprise a control chamber 80 formed between the outer face 60 of the coupling member 50 and the inner faces 62 of the cylinder block 6 and 82 of the distributor 16 which are situated facing said outer face 60. An auxiliary duct 84 communicates with said control chamber 80, thereby enabling it to be filled with fluid under pressure or to be emptied. When the chamber 80 is filled with fluid under pressure, the coupling member 50 is displaced from its inactive position into its active position so that the second mechanical engagement means 54 are engaged, with the teeth 72 and 74 of the positive clutch meshing. In contrast, when the control chamber is empty, the coupling member 50 returns towards its inactive position.

This return is facilitated by the presence of a spring 86 which urges the actuator 50 towards its inactive position. The spring 86 is disposed in the control chamber 80. Its first end 87 bears against the cylinder block 6 (in the region of its communication face 28), and its second end 88 bears against the outer face 60 of the actuator (via a locking member 90). The natural resilient expansion of the spring thus tends to urge the actuator 50 away from the flanges 64 and 68.

The control chamber 80 includes a wall 92 formed on an inner face of the fixed casing 2 (more precisely on an inside face of the portion 2A thereof) and extending between the coupling member 50 and the inner distributor 16. The auxiliary duct 84 is formed in the fixed casing 2 (in its portion 2A) and it opens out into said wall 92. This constitutes an advantage because since the auxiliary duct is provided in a fixed and accessible portion of the motor, it is easier to connect it to a system for feeding it with fluid under pressure. The chamber 80 is defined by three sealing rings.

The first sealing ring 94 is disposed between the inside face 62 of the cylinder block 6 and the outside face 60 of the coupling member 50. More precisely, this sealing ring 94 is disposed between the axial portion of the setback 62b in the face 62 and the projecting region 60b of the outside face 60 situated in the vicinity of the radial end of the flange 64.

The second sealing ring 96 is situated between the inside face of the fixed casing from which the wall 92 is formed and the outside face 60 of the coupling member, or more precisely, the axial portion 60a thereof.

The third sealing ring 98 is disposed between the inside face of the fixed casing and the internal distributor 16. This sealing ring 98 is of the type used conventionally for connecting in sealed manner the facing faces of the distributor and of the casing. By way of example, it should be observed that a similar sealing ring is disposed between the grooves 22 and 24.

The sealing rings 94 and 98 provide static sealing, whereas the sealing ring 96 provides dynamic sealing.

Figure 3:
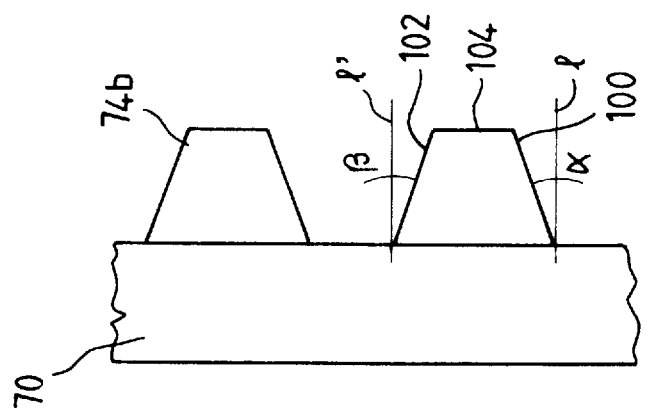
FIG. 3 is a fragmentary view seen looking along arrow F of FIG. 2.
Figure 2:
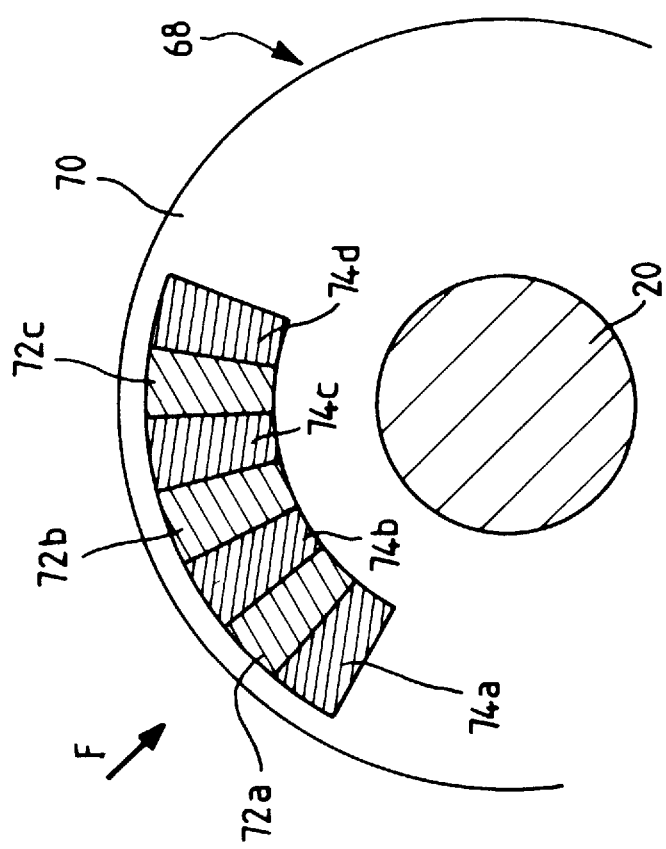
FIG. 2 is a fragmentary cross-section on line II—II of FIG. 1.

The teeth of the positive clutch 54 are described below with reference to FIGS. 2 and 3. FIG. 2 is a cross-section with only some of the teeth (72a, 72b, and 72c) of the first series of teeth 72 being shown and only some of the teeth (74a, 74b, 74c, and 74d) of the second series of teeth 74 being shown. It can be seen that these teeth mesh between one another. They are complementary in shape as can be seen more clearly in FIG. 3 which, in a view as seen when looking along arrow F of FIG. 2, shows only the teeth 74a and 74b. Like the other teeth, the tooth 74a has first and second sloping lateral faces 100 and 102 at respective angles of inclination $\alpha$ and $\beta$ relative to the axial direction as represented by lines 1 and 1'. The tooth 74a also has an end face 104 extending transversely. The teeth extend generally radially.

The inclinations $\alpha$ and $\beta$ of the inclined lateral faces are such that the teeth in the first and second series of teeth disengage when the pressure applied by the first engagement face 66 is less than a predetermined value. It should be observed that this predetermined value is conventionally of the same order as the pressures implemented in the brake-release chambers, e.g. about 10 bars. When the control means for the displacement member 50 include the control chamber 80, then the application pressure is the pressure that obtains in said chamber.

The angles $\alpha$ and $\beta$ are preferably equal, i.e. the teeth are symmetrical in profile such that the disengagement pressure is equal in either direction of rotation of the motor.

Nevertheless, the teeth may be asymmetrical in profile, with different angles $\alpha$ and $\beta$, specifically to obtain disengagement pressures that are different in the two directions of rotation of the motor.

I claim:

1. An auxiliary hydraulic motor comprising:

a fixed casing having main ducts for fluid feed and exhaust;

a reaction member secured to the casing;

a cylinder block mounted to rotate relative to said reaction member about an axis of rotation and including a plurality of piston-and-cylinder assemblies disposed radially relative to the axis of rotation and suitable for being fed with fluid under pressure;

an internal fluid distributor secured to the casing against rotation about the axis of rotation and including distribution ducts suitable for putting the cylinders into communication with the main fluid feed and exhaust ducts; and a through shaft extending inside the casing along the axis of rotation;

wherein one end portion of said through shaft extends through one end of said casing and a second end portion of said through shaft extends through another end of said casing, opposite the one end wherein the motor further includes a coupling member which is disposed inside said fixed casing between roller bearings which rotatably support said through shaft with respect to said casing, first mechanical engagement means for constraining the coupling member and the cylinder block to rotate together, and a second mechanical engagement means for constraining the coupling member and the through shaft to rotate together, the coupling member being axially movable between an "active" first position in which the first and second engagement means fare mutually engaged, and an "inactive" second position in which at least one of the first and second mechanical engagement means are disengaged, the motor including control means for controlling displacement of the coupling member between said first and second positions.

2. A motor according to claim 1, wherein the coupling member and the through shaft include respective first and second flanges having respective first and second substantially radial engagement faces, and wherein the second mechanical engagement means are constituted by a positive clutch comprising first and second series of teeth respectively provided on the first and second engagement faces, the teeth of said first and second series meshing together in the active position of the coupling member and being spaced apart in the inactive position of said member.

3. A motor according to claim 2, wherein the teeth of the first and second series of teeth of the positive clutch are of complementary shape, each having a profile comprising first and second inclined lateral faces at respective inclinations relative to the axial direction such that the teeth of the first and second series disengage when a pressure with which the first engagement face is applied is less than a predetermined value.

4. A motor according to claim 3, wherein the teeth are symmetrical in profile.

5. A motor according to claim 1, wherein the coupling member is disposed coaxially around the through shaft and has an outside face situated facing an inside face the cylinder block, the first mechanical engagement means including axial fluting formed respectively in said outside face and in said inside face, and meshing in both the first and second positions of the coupling member.

6. A motor according to claim 1, wherein the coupling member is disposed coaxially around the through shaft, the cylinder block and the internal fluid distributor themselves being disposed around the coupling member, wherein the means for controlling displacement of the coupling member comprise a control chamber formed between an outside face of the coupling member, an inside face of the cylinder block and an inside face of the internal fluid distributor, said inside faces being situated facing said outside face, and an auxiliary duct communicating with the control chamber, said chamber being suitable for being filled with fluid under pressure to cause the coupling member to move axially from its inactive position to its active position.

7. A motor according to claim 6, wherein the control chamber includes a wall formed on an inside face of the fixed casing and extending between the coupling member and the internal distributor, wherein the auxiliary duct is formed in the fixed casing and opens out in said wall, and wherein the chamber is defined by three sealing rings, the first sealing ring being between the inside face of the cylinder block and the outside face of the coupling member, the second sealing ring being between the inside face of the fixed casing and the outside face of the coupling member, and the third sealing ring being between the inside face of the fixed casing and the internal distributor.

8. A motor according to claim 6, wherein a spring is disposed in the control chamber for returning the coupling member towards its inactive position.

9. An auxiliary hydraulic motor comprising:

a fixed casing having main ducts for fluid feed and exhaust;

a reaction member secured to the casing;

a cylinder block mounted to rotate relative to said reaction member about an axis of rotation and including a plurality of piston-and-cylinder assemblies disposed radially relative to the axis of rotation and suitable for being fed with fluid under pressure;

an internal fluid distributor secured to the casing against rotation about the axis of rotation and including distribution ducts suitable for putting the cylinders into communication with the main fluid feed and exhaust ducts; and a through shaft extending inside the casing along the axis of rotation;

wherein one end portion of said through shaft extends through one end of said casing and a second end portion of said through shaft extends through another end of said casing, opposite the one end;

wherein the motor further includes a coupling member disposed inside said fixed. casing, first mechanical engagement means for constraining the coupling member and the cylinder block to rotate together, and second mechanical engagement means for constraining the coupling member and the through shaft to rotate together, the coupling member being axially movable between an active first position in which the first and second engagement means are mutually engaged, and an inactive second position in which at least one of the first and second mechanical engagement means are disengaged, the motor including control means for controlling displacement of the coupling member between said first and second positions; and wherein the coupling member is disposed coaxially around the through shaft, the cylinder block and the internal fluid distributor themselves being disposed around the coupling member.

10. A motor according to claim 9, wherein the means for controlling displacement of the coupling member comprise a control chamber formed between an outside face of the coupling member and an inside face of the cylinder block and of the internal fluid distributor situated facing said outside face, and an auxiliary duct communicating with the control chamber, said chamber being suitable for being filled with fluid under pressure to cause the coupling member to move axially from its inactive position to its active position.

11. A motor according to claim 10, wherein the control chamber includes a wall formed on an inside face of the fixed casing and extending between the coupling member and the internal distributor, wherein the auxiliary duct is formed in the fixed casing and opens out in said wall, and wherein the chamber is defined by three sealing rings, the first sealing ring being between the inside face of the cylinder block and the outside face of the coupling member, the second sealing ring being between the inside face of the fixed casing and the outside face of the coupling member, and the third sealing ring being between the inside face of the fixed casing and the internal distributor.

12. A motor according to claim 11, wherein a spring is disposed in the control chamber for returning the coupling member towards its inactive position.

13. A motor according to claims 9 or 10, wherein the coupling member and the through shaft include respective first and second flanges having respective first and second substantially radial engagement faces, and wherein the second mechanical engagement means are constituted by a positive clutch comprising first and second series of teeth respectively provided on the first and second engagement faces, the teeth of said first and second series meshing together in the active position of the coupling member and being spaced apart in the inactive position of said member.

14. A motor according to claim 13, wherein the teeth of the first and second series of teeth of the positive clutch are of complementary shape, each having a profile comprising first and second inclined lateral faces at respective inclinations relative to the axial direction such that the teeth of the first and second series disengage when the pressure with which the first engagement face is applied is less than a predetermined value.

15. A motor according to claim 14, wherein the teeth are symmetrical in profile.

16. A motor according to claims 9 or 10, wherein the coupling member is disposed coaxially around the through shaft and has an outside face situated facing an inside face the cylinder block, the first mechanical engagement means including axial fluting formed respectively in said outside face and in said inside face, and co-operating in both the first and second positions of the coupling member.

* * * * *